US012694449B2

(12) United States Patent
Raman et al.

(10) Patent No.: US 12,694,449 B2
(45) Date of Patent: Jul. 28, 2026

(54) METHODS AND SYSTEMS FOR REAL-TIME CONFIGURATION OF ASSET LICENSING FRAMEWORK FOR GENERATING NON-FUNGIBLE TOKENS

(71) Applicant: Tata Consultancy Services Limited, Mumbai (IN)

(72) Inventors: Malini Raman, Chennai (IN); Ashok Seshadri, Chennai (IN); Namitha Jeremiah, Chennai (IN); Rohit Trivedi, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/963,032

(22) Filed: Nov. 27, 2024

(65) Prior Publication Data

US 2025/0200659 A1      Jun. 19, 2025

(30) Foreign Application Priority Data

Dec. 19, 2023    (IN) .............................. 202321086945

(51) Int. Cl.
G06Q 40/04 (2012.01)

(52) U.S. Cl.
CPC ......... G06Q 40/04 (2013.01); G06Q 2220/18 (2013.01)

(58) Field of Classification Search
None
See application file for complete search history.

(56) References Cited

U.S. PATENT DOCUMENTS

2022/0351195 A1*  11/2022  Quigley ............. G06Q 20/1235
2023/0118213 A1*  4/2023  Quigley ................. G06Q 20/40
                                                              705/65

(Continued)

FOREIGN PATENT DOCUMENTS

WO    WO-2023028462 A1 *  3/2023 ......... G06Q 30/0601
WO    WO2023030240 A1    3/2023

(Continued)

OTHER PUBLICATIONS

Schaefer, Enrico, "Licensing NFTs: You Need to Know who Owns What You're Selling", Date: Jan. 29, 2022, Publisher: Traverse Legal, PLC, Link: https://www.traverselegal.com/blog/nfts-attorney-tech-blockchain-art-license/.

(Continued)

*Primary Examiner* — Neha Patel
*Assistant Examiner* — Jahed Ali
(74) *Attorney, Agent, or Firm* — Finnegan, Henderson, Farabow, Garrett & Dunner, LLP

(57) ABSTRACT

The disclosure relates generally to methods and systems for real-time configuration of asset licensing framework for generating non-fungible tokens. Current marketplaces do not safeguard the users with respect to IP rights or copyright infringement since there is no licensing agreement signed at a point of sale of NFTs. The present disclosure provides a standard framework which comprises a configurable set of licensing options that need to be agreed by the transacting parties at the time of NFT sale. These options are embedded into the NFTs in the form of smart contracts, which automatically get executed based on specific events such as secondary sale. The standard license terms are created by administrator that contains both tangible and intangible terms and clauses. The tangible clauses are enforced by smart contracts, whilst intangible clauses can be customized (Continued)

when user is onboarded onto marketplace which can be further extended during each NFT sale.

15 Claims, 8 Drawing Sheets

(56) References Cited

U.S. PATENT DOCUMENTS

| | | | |
|---|---|---|---|
| 2023/0131603 A1* | 4/2023 | Quigley | G06Q 20/38215 |
| | | | 705/65 |
| 2023/0245102 A1* | 8/2023 | Mistele | G06Q 20/3821 |
| | | | 705/66 |
| 2023/0281604 A1* | 9/2023 | Robell | G06Q 30/018 |
| 2023/0368291 A1* | 11/2023 | Padmanabhan | H04L 9/50 |
| 2023/0419283 A1* | 12/2023 | Le | G06Q 30/04 |
| 2024/0177145 A1* | 5/2024 | Miele | G06Q 30/01 |
| 2024/0202721 A1* | 6/2024 | Hu | G06Q 20/401 |
| 2024/0289898 A1* | 8/2024 | Thomas | G06Q 30/018 |
| 2025/0045808 A1* | 2/2025 | Li | G06Q 30/0607 |
| 2025/0156828 A1* | 5/2025 | Sliwka | H04L 9/3247 |

FOREIGN PATENT DOCUMENTS

| | | | | |
|---|---|---|---|---|
| WO | WO-2023101933 A1 * | 6/2023 | ............... | H04L 9/50 |
| WO | WO2023150242 A1 | 8/2023 | | |

OTHER PUBLICATIONS

Klein, David, "Why You Need an NFT License Agreement", Date: Nov. 11, 2021, Publisher: Klein Moynihan Turco LLP, Link: https://kleinmoynihan.com/do-you-need-an-nft-license-agreement-drafted-contract-lawyer-nyc/.

Tiwari, Aisshwarya, "NFT Minters Can Now Attach Custom Licences to their Artwork through NFTMagic", Date: Feb. 4, 2022, Publisher: crypto.news, Link: https://crypto.news/tag/nftmagic/.

Gatto, James et al., "NFT License Breakdown: Exploring Different Marketplaces and Associated License Issues", Date: Aug. 29, 2021, Publisher: sheppardmullin, Link: https://www.lawoftheledger.com/wp-content/uploads/sites/15/2021/09/NFT-License-Breakdown-Article-0921.pdf.

\* cited by examiner

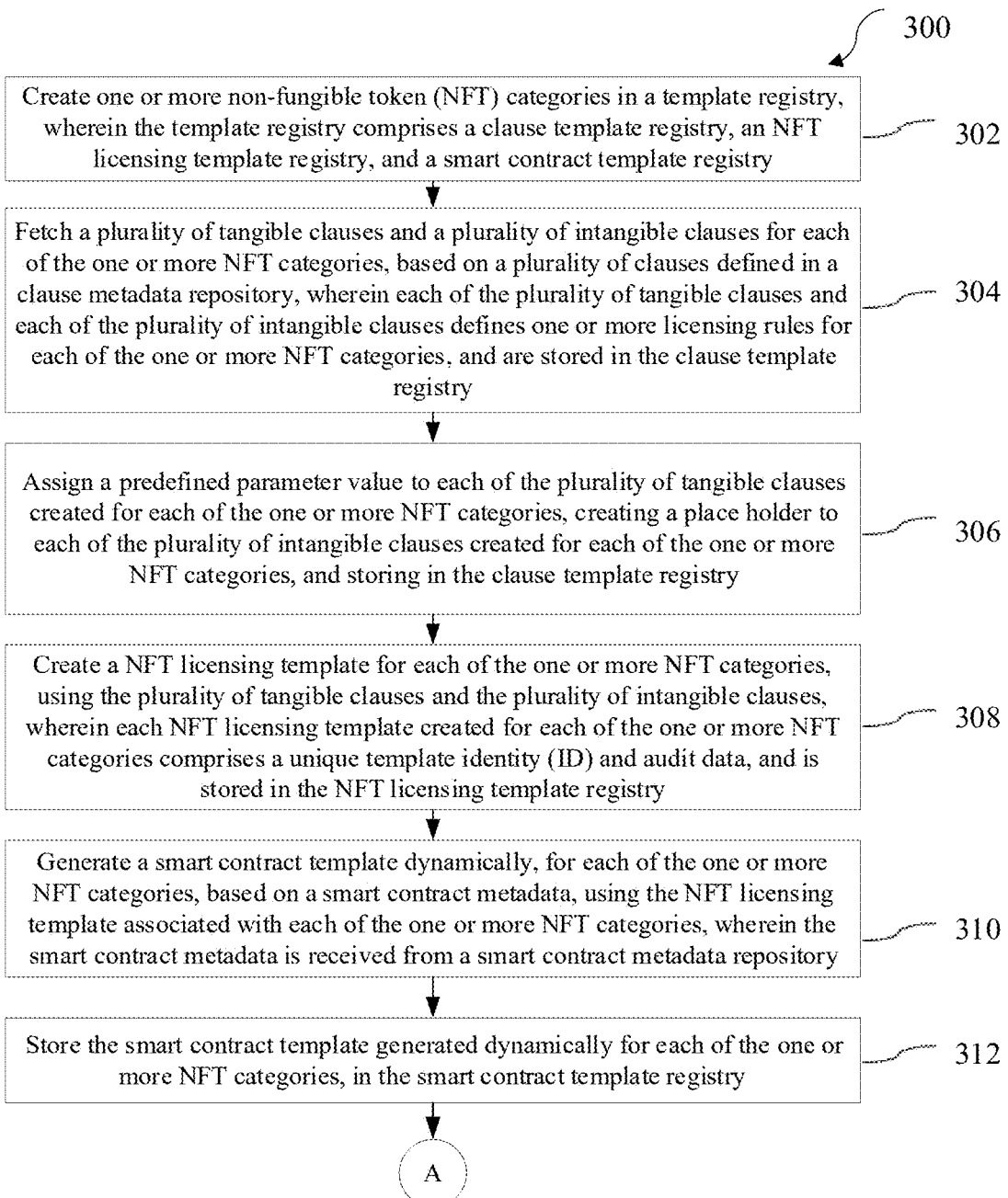

300

Create one or more non-fungible token (NFT) categories in a template registry, wherein the template registry comprises a clause template registry, an NFT licensing template registry, and a smart contract template registry — 302

Fetch a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry — 304

Assign a predefined parameter value to each of the plurality of tangible clauses created for each of the one or more NFT categories, creating a place holder to each of the plurality of intangible clauses created for each of the one or more NFT categories, and storing in the clause template registry — 306

Create a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry — 308

Generate a smart contract template dynamically, for each of the one or more NFT categories, based on a smart contract metadata, using the NFT licensing template associated with each of the one or more NFT categories, wherein the smart contract metadata is received from a smart contract metadata repository — 310

Store the smart contract template generated dynamically for each of the one or more NFT categories, in the smart contract template registry — 312

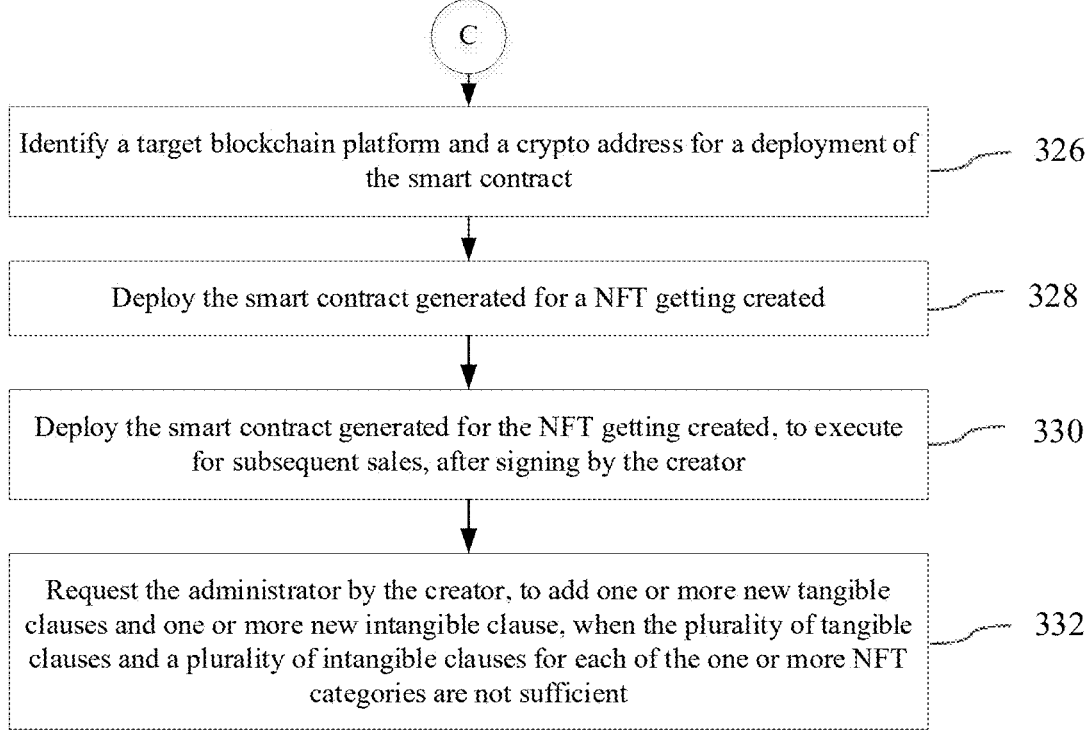

Identify a target blockchain platform and a crypto address for a deployment of the smart contract          326

Deploy the smart contract generated for a NFT getting created          328

Deploy the smart contract generated for the NFT getting created, to execute for subsequent sales, after signing by the creator          330

Request the administrator by the creator, to add one or more new tangible clauses and one or more new intangible clause, when the plurality of tangible clauses and a plurality of intangible clauses for each of the one or more NFT categories are not sufficient          332

FIG. 3C

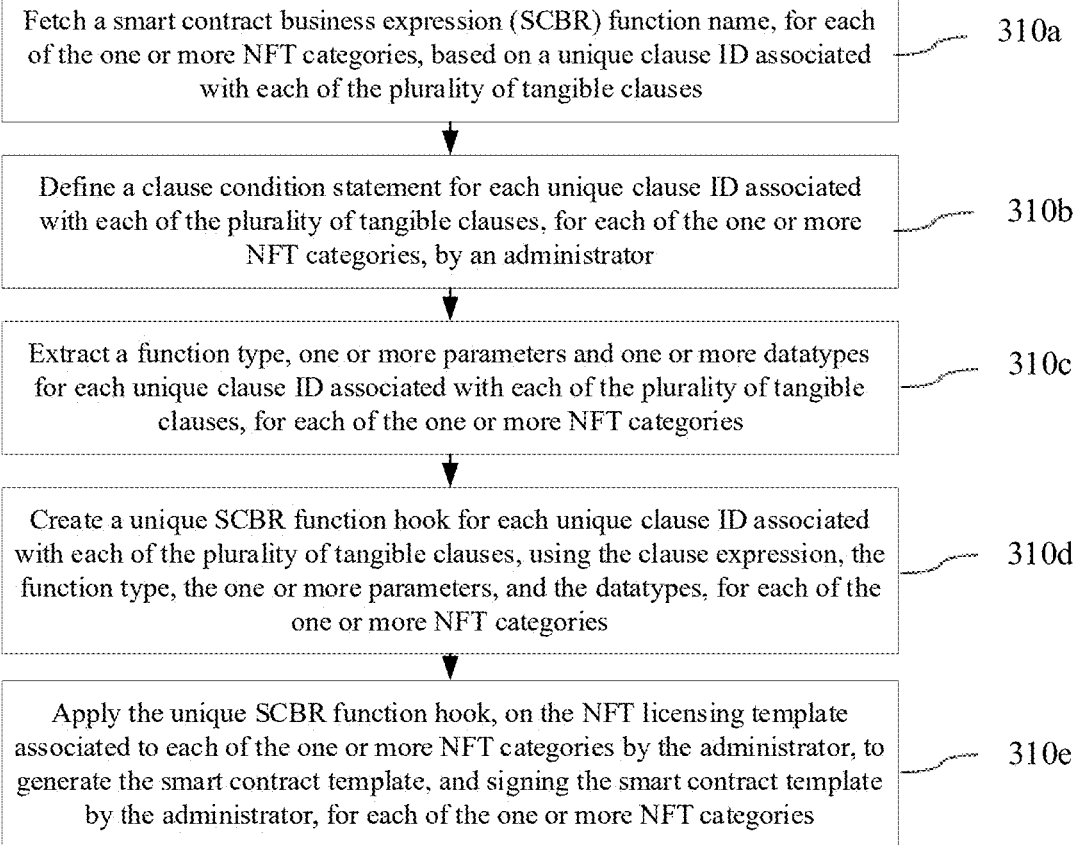

Fetch a smart contract business expression (SCBR) function name, for each of the one or more NFT categories, based on a unique clause ID associated with each of the plurality of tangible clauses          310a Define a clause condition statement for each unique clause ID associated with each of the plurality of tangible clauses, for each of the one or more NFT categories, by an administrator          310b Extract a function type, one or more parameters and one or more datatypes for each unique clause ID associated with each of the plurality of tangible clauses, for each of the one or more NFT categories          310c Create a unique SCBR function hook for each unique clause ID associated with each of the plurality of tangible clauses, using the clause expression, the function type, the one or more parameters, and the datatypes, for each of the one or more NFT categories          310d Apply the unique SCBR function hook, on the NFT licensing template associated to each of the one or more NFT categories by the administrator, to generate the smart contract template, and signing the smart contract template by the administrator, for each of the one or more NFT categories          310e

FIG. 4

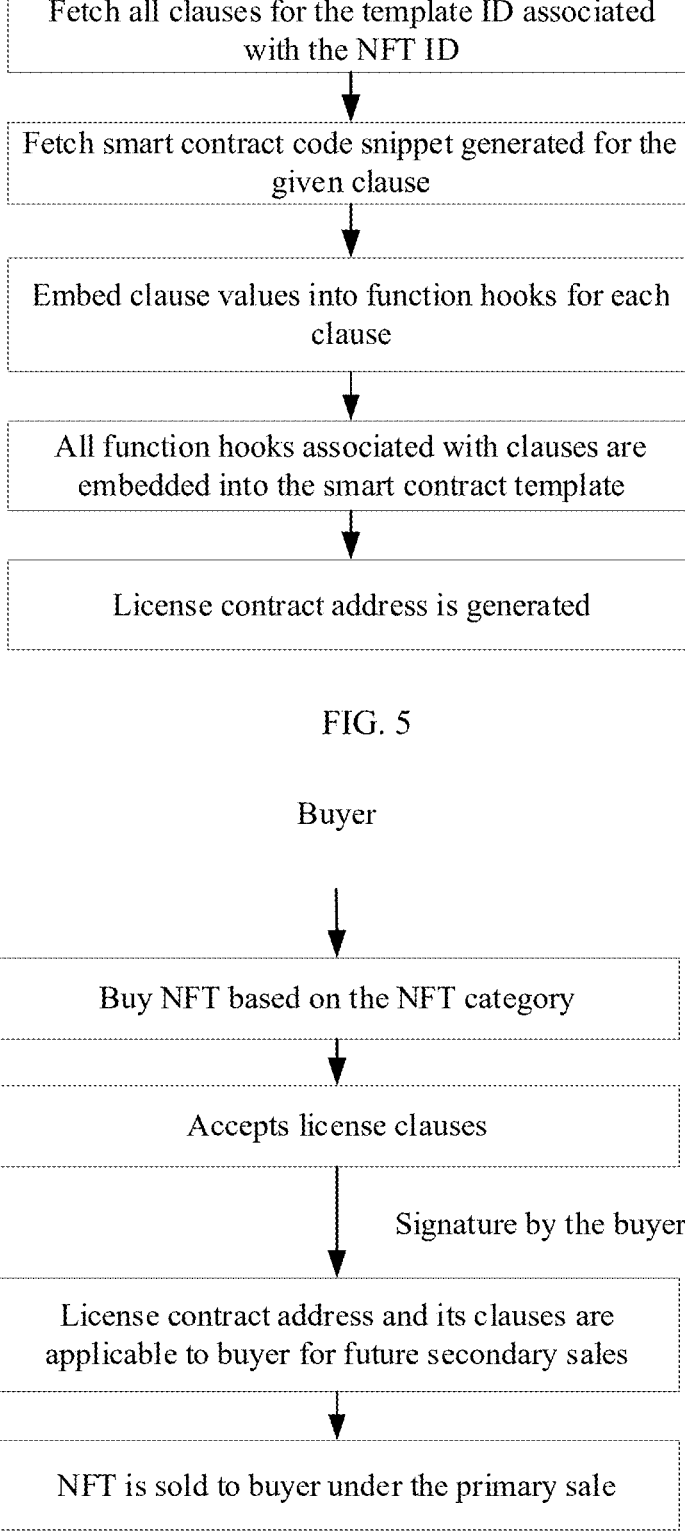

Fetch all clauses for the template ID associated
with the NFT ID

↓

Fetch smart contract code snippet generated for the
given clause

↓

Embed clause values into function hooks for each
clause

↓

All function hooks associated with clauses are
embedded into the smart contract template

↓

License contract address is generated

FIG. 5

Buyer

↓

Buy NFT based on the NFT category

↓

Accepts license clauses

↓ Signature by the buyer

License contract address and its clauses are
applicable to buyer for future secondary sales

↓

NFT is sold to buyer under the primary sale

FIG. 6

METHODS AND SYSTEMS FOR REAL-TIME CONFIGURATION OF ASSET LICENSING FRAMEWORK FOR GENERATING NON-FUNGIBLE TOKENS

PRIORITY CLAIM

This U.S. patent application claims priority under 35 U.S.C. § 119 to: Indian Patent Application number 202321086945, filed on Dec. 19, 2023. The entire contents of the aforementioned application are incorporated herein by reference.

TECHNICAL FIELD

The disclosure herein generally relates to the field of non-fungible tokens (NFTs), and more specifically to methods and systems for real-time configuration of asset licensing framework for generating non-fungible tokens.

BACKGROUND

NFTs (non-fungible tokens) are unique cryptographic tokens that exist on a blockchain platform and hence cannot be replicated. The NFTs are used to represent digital and real-world items such as artwork and real estate. Hence the NFTs are referred as assets that have been tokenized, and each NFT is assigned with unique identification codes and metadata that distinguish them from other tokens. Tokenizing the assets makes buying, selling, and trading them more efficient while reducing the probability of fraud. Hence the NFTs can be traded and exchanged for money, cryptocurrencies, or other NFTs, based on the type of NFTs and the related marketplace.

Configurable and extendable NFT licensing options offers a unique way to customize intangible licensing terms between buyer and seller thereby allowing better terms and conditions to be mutually agreed during the sale process. However, there is no standard framework for sale of the NFTs at present, and hence mostly marketplaces do not safeguard the users with respect to Intellectual Property (IP) rights or copyright infringement since there is no licensing agreement signed at a point of sale. The sale only guarantees transfer of ownership of digital asset but not its IP rights.

SUMMARY

Embodiments of the present disclosure present technological improvements as solutions to one or more of the above-mentioned technical problems recognized by the inventors in conventional systems.

In an aspect, a processor-implemented method for real-time configuration of asset licensing framework for generating non-fungible tokens is provided. The method including the steps of: creating one or more non-fungible token (NFT) categories in a template registry, wherein the template registry comprises a clause template registry, an NFT licensing template registry, and a smart contract template registry; fetching a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry; assigning a predefined parameter value to each of the plurality of tangible clauses created for each of the one or more NFT categories, creating a place holder to each of the plurality of intangible clauses created for each of the one or more NFT categories, and storing in the clause template registry; creating a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry; generating a smart contract template dynamically, for each of the one or more NFT categories, based on a smart contract metadata, using the NFT licensing template associated with each of the one or more NFT categories, wherein the smart contract metadata is received from a smart contract metadata repository; storing the smart contract template generated dynamically for each of the one or more NFT categories, in the smart contract template registry; selecting the NFT licensing template based on an NFT category chosen by a creator, by mapping with the unique template identity (ID), from the NFT licensing template registry; choosing one or more tangible clauses out of the plurality of tangible clauses and one or more intangible clauses out of the plurality of intangible clauses, for the NFT licensing template, based on the one or more licensing rules, to create a custom NFT licensing template; allowing the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template; allowing the creator to provide a parameter value to (i) each of the one or more tangible clauses chosen, and (ii) the one or more custom clauses added, in the place holder associated to each clause; storing (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template; generating the smart contract, based on the unique linked list by the creator; identifying a target blockchain platform and a crypto address for a deployment of the smart contract; deploying the smart contract generated for a NFT getting created; deploying the smart contract generated for the NFT getting created, to execute for subsequent sales, after signing by the creator; and requesting the administrator by the creator, to add one or more new tangible clauses and one or more new intangible clause, when the plurality of tangible clauses and a plurality of intangible clauses for each of the one or more NFT categories are not sufficient.

In another aspect, a system for real-time configuration of asset licensing framework for generating non-fungible tokens is provided. The system includes: a memory storing instructions; one or more Input/Output (I/O) interfaces; and one or more hardware processors coupled to the memory via the one or more I/O interfaces, wherein the one or more hardware processors are configured by the instructions to: create one or more non-fungible token (NFT) categories in a template registry, wherein the template registry comprises a clause template registry, an NFT licensing template registry, and a smart contract template registry; fetch a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry; assign a predefined parameter value to each of the plurality of tangible clauses created for each of the one or more NFT categories, create a place holder to each of the plurality of intangible clauses created for each of the one or more NFT categories, and storing in the clause template registry; create a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry; generate a smart contract template dynamically, for each of the one or more NFT categories, based on a smart contract metadata, using the NFT licensing template associated with each of the one or more NFT categories, wherein the smart contract metadata is received from a smart contract metadata repository; store the smart contract template generated dynamically for each of the one or more NFT categories, in the smart contract template registry; selecting the NFT licensing template based on an NFT category chosen by a creator, by mapping with the unique template identity (ID), from the NFT licensing template registry; choose one or more tangible clauses out of the plurality of tangible clauses and one or more intangible clauses out of the plurality of intangible clauses, for the NFT licensing template, based on the one or more licensing rules, to create a custom NFT licensing template; allow the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template; allow the creator to provide a parameter value to (i) each of the one or more tangible clauses chosen, and (ii) the one or more custom clauses added, in the place holder associated to each clause; store (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template; generate the smart contract, based on the unique linked list by the creator; identify a target blockchain platform and a crypto address for a deployment of the smart contract; deploy the smart contract generated for a NFT getting created; deploy the smart contract generated for the NFT getting created, to execute for subsequent sales, after signing by the creator; and request the administrator by the creator, to add one or more new tangible clauses and one or more new intangible clause, when the plurality of tangible clauses and a plurality of intangible clauses for each of the one or more NFT categories are not sufficient.

In yet another aspect, there are provided one or more non-transitory machine-readable information storage mediums comprising one or more instructions which when executed by one or more hardware processors cause: creating one or more non-fungible token (NFT) categories in a template registry, wherein the template registry comprises a clause template registry, an NFT licensing template registry, and a smart contract template registry; fetching a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry; assigning a predefined parameter value to each of the plurality of tangible clauses created for each of the one or more NFT categories, create a place holder to each of the plurality of intangible clauses created for each of the one or more NFT categories, and storing in the clause template registry; creating a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry; generating a smart contract template dynamically, for each of the one or more NFT categories, based on a smart contract metadata, using the NFT licensing template associated with each of the one or more NFT categories, wherein the smart contract metadata is received from a smart contract metadata repository; storing the smart contract template generated dynamically for each of the one or more NFT categories, in the smart contract template registry; selecting the NFT licensing template based on an NFT category chosen by a creator, by mapping with the unique template identity (ID), from the NFT licensing template registry; choosing one or more tangible clauses out of the plurality of tangible clauses and one or more intangible clauses out of the plurality of intangible clauses, for the NFT licensing template, based on the one or more licensing rules, to create a custom NFT licensing template; allowing the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template; allowing the creator to provide a parameter value to (i) each of the one or more tangible clauses chosen, and (ii) the one or more custom clauses added, in the place holder associated to each clause; storing (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template; generating the smart contract, based on the unique linked list by the creator; identifying a target blockchain platform and a crypto address for a deployment of the smart contract; deploying the smart contract generated for a NFT getting created; deploying the smart contract generated for the NFT getting created, to execute for subsequent sales, after signing by the creator; and requesting the administrator by the creator, to add one or more new tangible clauses and one or more new intangible clause, when the plurality of tangible clauses and a plurality of intangible clauses for each of the one or more NFT categories are not sufficient.

In an embodiment, each clause of the plurality of clauses defined in the clause metadata repository, comprises clause details having a clause category, a unique clause identity (ID), a clause condition statement, and one or more response options provided for the clause condition statement, and are stored in the clause template registry.

In an embodiment, generating the smart contract template dynamically, for each of the one or more NFT categories, based on the smart contract metadata using the NFT licensing template associated with each of the one or more NFT categories, comprising: fetching a smart contract business expression (SCBR) function name, for each of the one or more NFT categories, based on a unique clause ID associated with each of the plurality of tangible clauses; defining a clause condition statement for each unique clause ID associated with each of the plurality of tangible clauses, for each of the one or more NFT categories, by an administrator; extracting a function type, one or more parameters and one or more datatypes for each unique clause ID associated with each of the plurality of tangible clauses, for each of the one or more NFT categories; creating a unique SCBR function hook for each unique clause ID associated with each of the plurality of tangible clauses, using the clause expression, the function type, the one or more parameters, and the datatypes, for each of the one or more NFT categories; and applying the unique SCBR function hook, on the NFT licensing template associated with each of the one or more NFT categories by the administrator, to generate the smart contract template, and signing the smart contract template by the administrator, for each of the one or more NFT categories.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A-3C illustrate exemplary flow diagrams of a processor-implemented method for real-time configuration of asset licensing framework for generating non-fungible tokens, using the system of FIG. 1, in accordance with some embodiments of the present disclosure.

FIG. 4 is a flowchart comprising steps for generating a smart contract template dynamically, for each of the one or more NFT categories, based on the smart contract metadata using the NFT licensing template associated with each of the one or more NFT categories, in accordance with some embodiments of the present disclosure.

FIG. 5 is a flowchart comprising steps for generating a license contract address for each NFT category, in accordance with some embodiments of the present disclosure.

FIG. 6 is a flowchart comprising steps for buying the NFT under a primary sale, in accordance with some embodiments of the present disclosure.

DETAILED DESCRIPTION

Figure 1:
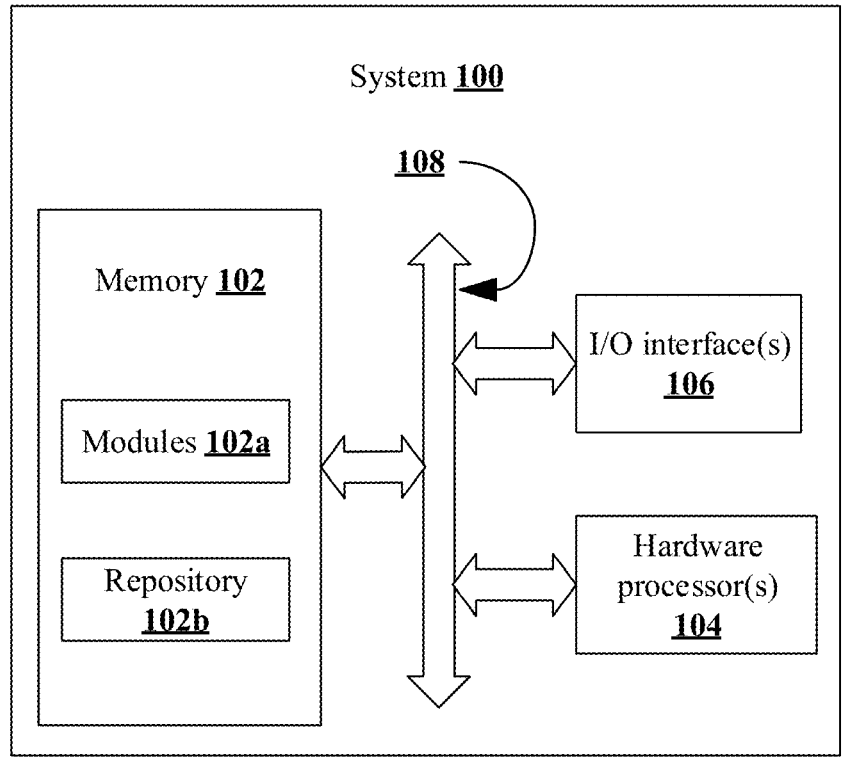
FIG. 1 is an exemplary block diagram of a system for real-time configuration of asset licensing framework for generating non-fungible tokens, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Configurable and extendable NFT licensing options offer a unique way to customize intangible licensing terms between buyer and seller thereby allowing better terms and conditions to be mutually agreed during the sale process. However, in the current world of NFTs, today there is no standard framework for sale of NFTs and hence mostly marketplaces do not safeguard users with respect to Intellectual Property (IP) rights or copyright infringement since there is no licensing agreement signed at point of sale. The sale only guarantees transfer of ownership of digital asset but not its IP rights.

The present disclosure solves the technical problems in the art with the methods and systems for real-time configuration of asset licensing framework for generating non-fungible tokens. The present disclosure addresses this gap by providing a standard framework which comprises a configurable set of licensing options that need to be agreed by the transacting parties at the time of NFT sale. These options are embedded into the NFTs in the form of smart contracts, which automatically get executed based on specific events such as a primary sale, and a secondary sale.

In the present disclosure, the standard license terms are created by the administrator (admin) in the real-time, that contains both tangible and intangible terms and clauses. The tangible clauses are enforced by smart contracts, whilst the intangible clauses can be customized when the user is onboarded onto the marketplace which can be further extended during each NFT sale.

Referring now to the drawings, and more particularly to FIG. 1 through FIG. 7, where similar reference characters denote corresponding features consistently throughout the figures, there are shown preferred embodiments and these embodiments are described in the context of the following exemplary systems and/or methods.

FIG. 1 is an exemplary block diagram of a system 100 for real-time configuration of asset licensing framework for generating non-fungible tokens, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface (GUI), and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
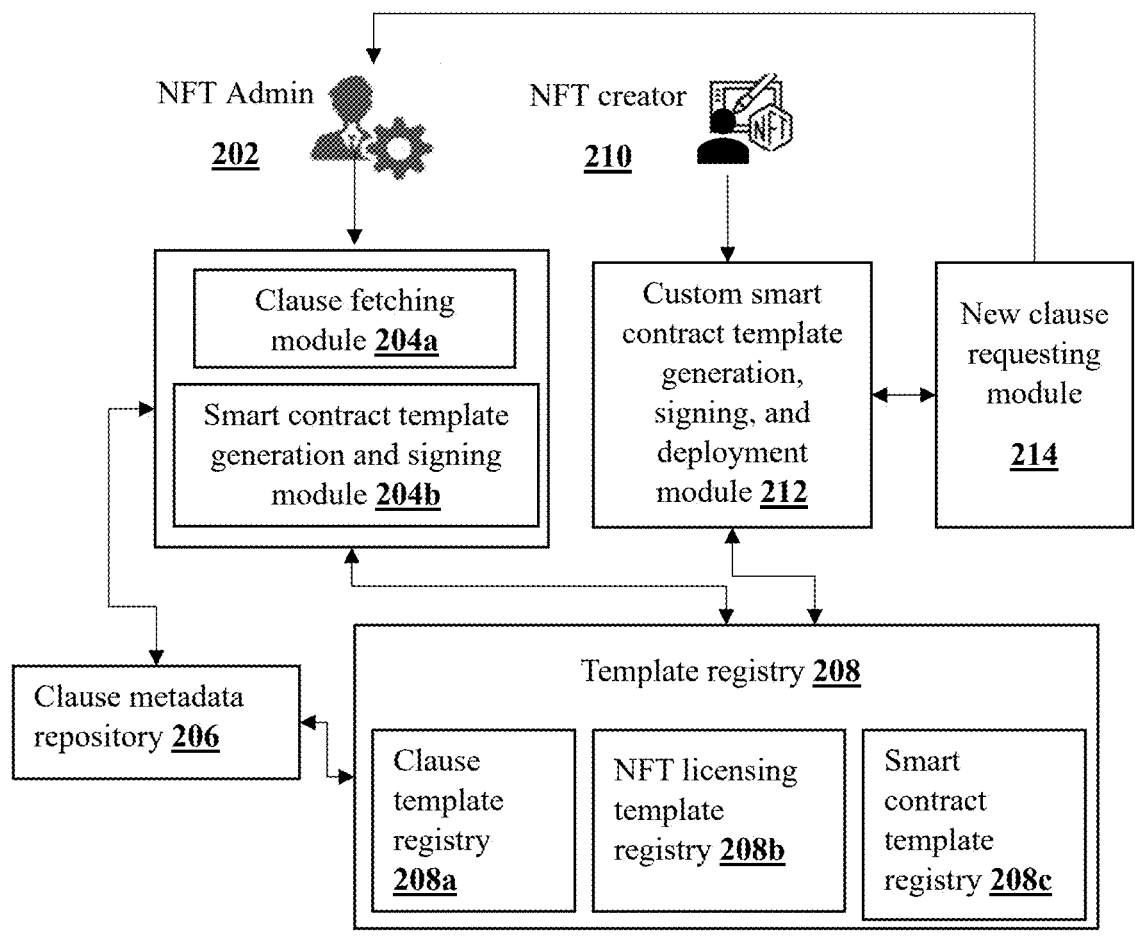
FIG. 2 is an exemplary block diagram illustrating a plurality of modules of the system of FIG. 1, for real-time configuration of asset licensing framework for generating non-fungible tokens, in accordance with some embodiments of the present disclosure.

Referring collectively to FIG. 2 and FIGS. 3A-3C, components and functionalities of the system 100 are described in accordance with an example embodiment of the present disclosure. For example, FIG. 2 is an exemplary block diagram illustrating the plurality of modules 102a of the system 100 of FIG. 1, for real-time configuration of asset licensing framework for generating non-fungible tokens, in accordance with some embodiments of the present disclosure. In an embodiment, the plurality of modules 102a include a NFT administrator 202, a clause fetching module 204a, a smart contract template generation and signing module 204b, a clause metadata repository 206, a template registry 208, a NFT creator 210, a custom smart contract template generation, signing and deployment module 212, and a new clause requesting module 214. The template registry 208 further includes a clause template registry 208a, a NFT licensing template registry 208b, and a smart contract template registry 208c.

Figure 3B:
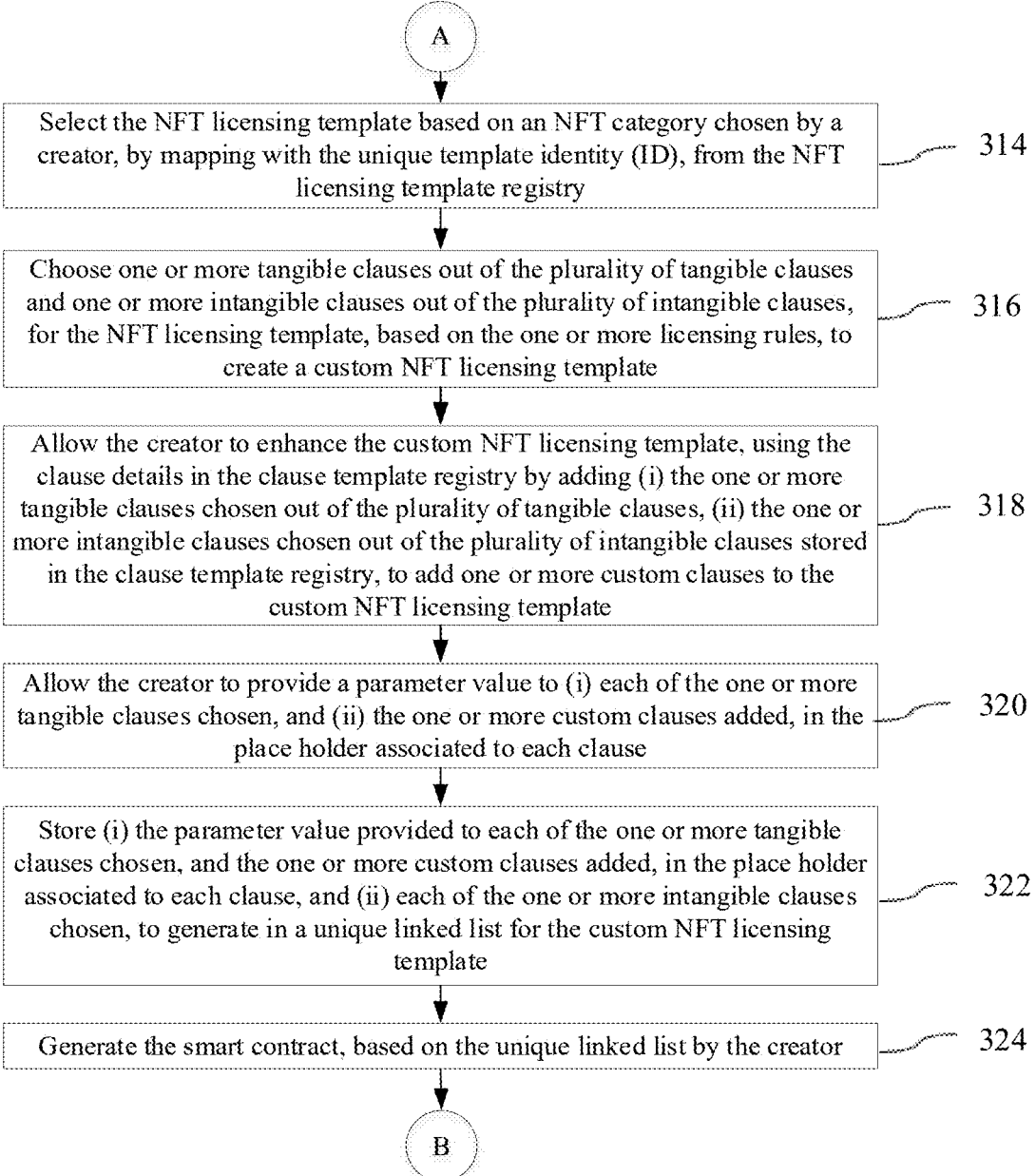

For example, FIGS. 3A-3C illustrate exemplary flow diagrams of a processor-implemented method 300 for real-time configuration of asset licensing framework for generating non-fungible tokens, using the system 100 of FIG. 1, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to create one or more non-fungible token (NFT) categories by an NFT administrator 202 (alternatively referred as admin). In an embodiment, the one or more non-fungible token (NFT) categories are associated with the type of NFT tokens including but are not limited to digital and real-world items such as artwork and real estate, and digital currency. In an embodiment, the one or more non-fungible token (NFT) categories are created and stored in a template registry 208. The template registry 208 further includes a clause template registry 208a, a NFT licensing template registry 208b, and a smart contract template registry 208c.

At step 304 of the method 300, the one or more hardware processors 104 of the system 100 are configured to fetch a plurality of tangible clauses and a plurality of intangible clauses for each of the one or more NFT categories created at step 302 of the method 300. The administrator 202 fetches the plurality of tangible clauses and the plurality of intangible clauses, through the clause fetching module 204a. The plurality of tangible clauses and a plurality of intangible clauses for each of the one or more NFT categories are fetched based on a plurality of clauses defined in a clause metadata repository 206. In an embodiment, each clause of the plurality of clauses are defined in the clause metadata repository 206. In an embodiment, each clause of the plurality of clauses contains clause details.

Each of the plurality of tangible clauses and each of the plurality of intangible clauses defines one or more licensing rules for each of the one or more NFT categories. The plurality of tangible clauses and the plurality of intangible clauses are stored in the clause template registry 208*a*. As the name indicates, the plurality of tangible clauses are the clauses that must be present based on the one or more licensing rules defined for the corresponding NFT category.

Below is an exemplary list of potential tangible clauses for the NFT licensing, but is not limited to:

Capping limit of Royalty distribution

Royalty free agreement

Royalty distribution for novel/humanitarian causes

Capping limit of Revenue generation through secondary sales

Owners cannot burn tokens

Owners cannot rent tokens.

Owners cannot sell more than 'n' number of copies

Further, as the name indicates, the plurality of intangible clauses are the clauses that may be relevant and included based on the one or more licensing rules defined for the corresponding NFT category. Below is an exemplary list of potential intangible clauses for the NFT licensing, but is not limited to:

Allows personal usage, but non-commercial usage is restricted with conditions OR not allowed.

License is revocable.

Non usage of art in connection with images of hatred, violence, or other inappropriate behavior is not permitted Usage of NFT to market or sell third-party products is restricted with conditions OR not allowed.

The clause details of each clause include a clause category, a unique clause identity (ID), a clause condition statement, and one or more response options provided for the clause condition statement (altogether called as clause metadata). In embodiment, the clause details of each clause are defined in the clause metadata repository 206 and stored in the clause template 5 registry 208*a*. Table 1 shows exemplary clause details of each clause of the plurality of tangible clauses and the plurality of intangible clauses.

TABLE 1

| Clause Category | Clause ID | Condition | Response Template | Response options |
| --- | --- | --- | --- | --- |
| Royalty | TACL001 | Are you expecting royalty? | <Yes>/<No> | Yes |
| Royalty | TACL002 | Type of royalty payment expected? | <percentage>/ <Amount>/ <Transactions> | Percentage |
| Royalty | TACL003 | What is the expected royalty % per sale? | Input: <Value> | E.g. 2% |
| Royalty | TACL004 | What is the expected royalty amount per sale? | <Unit> <Currency> | 0.001 ETH |
| Royalty | TACL005 | Do you want to stop royalty payments after 'N' of Transactions on this NFT? If yes, what's the limit? | <N> | 100 |

TABLE 1-continued

| Clause Category | Clause ID | Condition | Response Template | Response options |
| --- | --- | --- | --- | --- |
| Royalty | TACL006 | What is the maximum royalty amount expected for this NFT? | <Unit> <Currency> | 100 ETH |
| Commercial usage | INCL001 | Is commercial usage permitted? | <Yes>/<No> | Signature of agreement |
| Revocability | INCL002 | Is License revocable? | <Yes>/<No> | Signature of agreement |
| Sale Copies | TACL007 | What is the number of copies you can buy and resale? | <Value> | 50 |
| Sale Copies | TACL008 | What is the maximum revenue you can earn by reselling? | <Value> <Currency> | 2000 ETH |
| Sale Copies | TACL009 | What is the maximum sale price you can list for a copy? | <Value> <Currency> | 10 ETH |
| Service Fees | TACL010 | What is the maximum Service fee to be paid for NFT? | <Value> <Currency> | 0.5 ETH |
| Geo- Restriction | TACL011 | Which countries can you sell NFT? | <dropdown> <Country> | |
| Marketplace Restriction | TACL012 | Which marketplaces can you sell NFTs? | <dropdown> <Predefined list of Marketplaces> | |

At step 306 of the method 300, the one or more hardware processors 104 of the system 100 are configured to assign a predefined parameter value to each of the plurality of tangible clauses fetched for each of the one or more NFT categories, by the administrator 202. Further, a place holder is created by the administrator 202 to each of the plurality of intangible clauses created for each of the one or more NFT categories. Further, the predefined parameter value to each of the plurality of tangible clauses and the place holder created to each of the plurality of intangible clauses are stored in the clause template registry 208*a*.

At step 308 of the method 300, the one or more hardware processors 104 of the system 100 are configured to create a NFT licensing template for each of the one or more NFT categories created at step 302 of the method 300, by the administrator 202. The NFT licensing template for each NFT category includes the plurality of tangible clauses and the plurality of intangible clauses that are fetched to the corresponding NFT category at step 304 of the method 300.

In an embodiment, each NFT licensing template created for each of the one or more NFT categories includes a unique template identity (ID) and audit data and is stored in the NFT licensing template registry 208*b*. The audit data comprises who and when created and including the status.

Table 2 shows exemplary NFT licensing template created for each of the one or more NFT categories.

TABLE 2

| Template ID | NFT Category | Audit information |
|---|---|---|
| TEMPL001 | ALL | Information such as Template Status, who and when created the template |
| TEMPL002 | Automotive Design | Newly Created |
| TEMPL003 | Metaverse | Newly Created |
| TEMPL004 | Historic Moments | Newly Created |
| TEMPL005 | Digital Arts | Newly Created |
| TEMPL006 | Retail | Newly Created |
| TEMPL007 | Limited Editions | Newly Created |
| TEMPL008 | Sports | Newly Created |
| TEMPL009 | Events | Newly Created |
| TEMPL010 | . . . | . . . |

At step 310 of the method 300, the one or more hardware processors 104 of the system 100 are configured to generate a smart contract template dynamically, for each of the one or more NFT categories. The administrator 202 generates the smart contract template dynamically, for each of the one or more NFT categories, through the smart contract template generation and signing module 204*b*. The smart contract template is generated for each NFT category, based on a smart contract metadata, using the NFT licensing template associated with each of the one or more NFT categories. In an embodiment, the smart contract metadata is received from a smart contract metadata repository (not shown in FIG. 2).

FIG. 4 is a flowchart comprising steps for generating a smart contract template dynamically, for each of the one or more NFT categories, based on the smart contract metadata using the NFT licensing template associated with each of the one or more NFT categories (step of 310 of method 300), in accordance with some embodiments of the present disclosure. As shown in FIG. 4, generating the smart contract template dynamically, for each of the one or more NFT categories is further explained through steps 310*a* through 310*e*. At step 310*a*, a smart contract business expression (SCBR) function name is fetched for each of the one or more NFT categories, based on a unique clause ID associated with each of the plurality of tangible clauses fetched at step 304 of the method 300.

At step 310*b*, a clause condition statement is defined for each unique clause ID associated with each of the plurality of tangible clauses, for each of the one or more NFT categories, by an administrator.

At step 310*c*, a plurality of details such as a function type, one or more parameters and one or more datatypes are extracted, for each unique clause ID associated with each of the plurality of tangible clauses, for each of the one or more NFT categories, from the smart contract metadata repository.

At step 310*d*, a unique SCBR function hook is created for each unique clause ID associated with each of the plurality of tangible clauses. The unique SCBR function hook is created for each unique clause ID associated with each of the plurality of tangible clauses using the corresponding clause expression, the corresponding function type, the corresponding one or more parameters, and the corresponding datatypes, extracted for each of the one or more NFT categories at step 310*c*.

At step 310*e*, the smart contract template for each NFT category is generated dynamically using the unique SCBR function hook created at step 310*d*, for each of the one or more NFT categories. Further, the NFT licensing template created for each NFT category is signed by the administrator 202, to generate the smart contract template for each NFT category, using the unique SCBR function hook.

At step 312 of the method 300, the one or more hardware processors 104 of the system 100 are configured to store the smart contract template generated dynamically for each of the one or more NFT categories at step 310 of the method 300, in the smart contract template registry 208*c*. The administrator 202 stores the smart contract template generated dynamically for each of the one or more NFT categories in the smart contract template registry 208*c*. The administrator 202 generates, signs, and stores the smart contract template dynamically, for each of the one or more NFT categories as explained through steps 302 to 312 of the present disclosure.

Table 3 shows exemplary smart contract templates generated dynamically for each of the one or more NFT categories.

TABLE 3

| Template ID | Clause ID | Type | Modifiable | Created By |
|---|---|---|---|---|
| TEMPL001 | TACL001 | 0-Tangible | Y | Admin |
| TEMPL001 | TACL002 | 1-Intangible | N | Admin |
| TEMPL001 | TACL003 | 0-Tangible | N | Admin |
| TEMPL002 | TACL002 | 0-Tangible | Y | Admin |
| TEMPL002 | TACL005 | 1-Intangible | N | Admin |
| TEMPL002 | INCL002 | 1-Intangible | N | Admin |
| TEMPL002 | n . . . | n . . . | n . . . | n . . . |

Once the smart contract templates for each of the one or more NFT categories are available, they can be used as they are available, or they may be customized based on the requirement of the user for the NFT sales. Hence, at step 314 of the method 300, the one or more hardware processors 104 of the system 100 are configured to select the NFT licensing template based on a NFT category chosen by a NFT creator 210. In an embodiment, the NFT creator 210 is the user or a person who wants to sale the NFTs, through the NFT framework of the present disclosure. The creator 210 selects the NFT licensing template by mapping with the unique template identity (ID) of the NFT licensing template, from the NFT licensing template registry 208*b*.

At step 316 of the method 300, the one or more hardware processors 104 of the system 100 are configured to choose one or more tangible clauses out of the plurality of tangible clauses and one or more intangible clauses out of the plurality of intangible clauses, for the NFT licensing template selected at step 314 of the method 300. In an embodiment, the one or more tangible clauses out of the plurality of tangible clauses and the one or more intangible clauses out of the plurality of intangible clauses, are chosen, based on the one or more licensing rules associated to the clauses and the NFT licensing template, to create a custom NFT licensing template. Hence the custom NFT licensing template includes only the one or more tangible clauses among the plurality of tangible clauses and the one or more intangible clauses among the plurality of intangible clauses.

At step 318 of the method 300, the one or more hardware processors 104 of the system 100 are configured to allow the creator 210 to enhance the custom NFT licensing template, using the clause details in the clause template registry 208*a*.

The creator 210 enhances the custom NFT licensing template based on the requirement, by adding (i) the one or more tangible clauses and the one or more intangible clauses chosen at step 316 of the method 300, to further add one or more custom clauses to the custom NFT licensing template.

At step 320 of the method 300, the one or more hardware processors 104 of the system 100 are configured to allow the creator 210 to provide a parameter value to (i) each of the one or more tangible clauses chosen at step 316 of the method 300, and (ii) the one or more custom clauses created at step 318 of the method, in the place holder associated to each clause.

At step 322 of the method 300, the one or more hardware processors 104 of the system 100 are configured to store (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template. In an embodiment, the unique linked list for the custom NFT licensing template is in the form of a single-dimensional linked list storing user input as data and clause pointers (linked list address reference, not crypto address) which refers to the next clause. Each node will have data (i.e., user input) and an address field that contains a reference to the next node. The changes in selection will automatically reflect in the unique linked list.

At step 324 of the method 300, the one or more hardware processors 104 of the system 100 are configured to generate the smart contract, by signing, based on the unique linked list by the creator 210 at step 322 of the method 300. The custom smart contract template generation, signing and deployment module 212 is configured to generate the smart contract, based on the unique linked list created by the creator 210.

At step 326 of the method 300, the one or more hardware processors 104 of the system 100 are configured to identify a target blockchain platform and a crypto address for a deployment of the smart contract generated at step 324 of the method 300, by the creator 210.

At step 328 of the method 300, the one or more hardware processors 104 of the system 100 are configured to deploy the smart contract generated for a NFT getting created by the creator 210 in the identified target blockchain platform, using the identified crypto address.

Hence, the NFT creators 210 set up license conditions for their NFTs before creating the NFT on the blockchain. The system 100 consolidates all the clauses from and display it for creators 210 to pick clauses which they want to configure for their NFT. Further the system 100 prompts the creators 210 to select clauses and provide values accordingly for each clause if applicable. All the displayed clauses are approved by the administrator 202 providing assurance to the creators 210 that clauses are verified. The system 100 demands the creator 210 to sign the mart contract cryptographically to prove that the license clauses were applied by the creator 210 itself.

The creator 210 then selects the clauses from configurable template IDs available in the system 100. The system 100 consolidates the selected clauses and the creator then signs the selections cryptographically so that it can be proved over the blockchain that the creator 210 is the owner of the license. The NFT ID is generated which is assigned to the selected template ID. The creator 210 can create n number of NFTs by selecting different template IDs for which NFT IDs will be generated and mapped in the form of the table. Below table 4 shows an exemplary NFT licensing template mapping table.

TABLE 4

| NFT ID | Template ID | NFT creator | Modifiable | NFT creator Signature | Created By |
|---|---|---|---|---|---|
| NFT 1 | TEMPL001 | user01 | N | 2bcd . . . tyrr | User 1 |
| NFT 2 | TEMPL002 | user01 | N | 3acd . . . pyrr | User 1 |
| NFT 3 | TEMPL001 | user02 | N | 4ccd . . . kyrr | User 2 |
| NFT 4 | TEMPL004 | user03 | N | 5dcd . . . 2yrr | User 3 |
| NFT 5 | TEMPL005 | user04 | N | 6fcd . . . 5yrr | User 4 |
| NFT 6 | TEMPL006 | user05 | N | 74cd . . . yyrr | User 5 |
| NFT 7 | n . . . | n . . . | n . . . | n . . . | n . . . |

Table 5 shows an exemplary NFT licensing template and clause mapping table.

TABLE 5

| NFT ID | Template ID | Clause ID | Modifiable | Creator Signature | Created By |
|---|---|---|---|---|---|
| NFT 1 | TEMPL001 | TACL001 | Y | 2bcd . . . tyrr | user01 |
| NFT 1 | TEMPL001 | TACL002 | N | 2bcd . . . tyrr | user01 |
| NFT 1 | TEMPL001 | TACL003 | N | 2bcd . . . tyrr | user01 |
| NFT 1 | TEMPL001 | TACL004 | N | 2bcd . . . yrr | user01 |
| NFT 1 | TEMPL001 | INCL001 | N | 2bcd . . . tyrr | user01 |
| NFT 2 | TEMPL002 | TACL001 | N | 3acd . . . pyrr | user01 |
| NFT 2 | TEMPL002 | TACL003 | Y | 3acd . . . pyrr | user01 |
| NFT 2 | TEMPL002 | INCL001 | N | 3acd . . . pyrr | user01 |
| NFT 2 | TEMPL002 | INCL002 | N | 3acd . . . pyrr | user01 |

All the clauses written in master template (from clause table) are combined and written as smart contract functions, but they are not deployed. FIG. 5 is a flowchart comprising steps for generating a license contract address for each NFT category, in accordance with some embodiments of the present disclosure. As shown in FIG. 5, when the administrator 202 creates the clauses for templates, the system 100 creates respective smart contract function hooks which are understood by the underlying blockchain. The clauses are converted with parameter values as placeholders which are populated once creator 210 selects clauses and inputs required values. Then, the system 100 consolidates all the function hooks and embeds them in boilerplate smart contract (template). The clause values are also embedded into functions as entered by creators 210. As next step, the license contract is deployed for the NFT, and contract address is generated accordingly.

Table 6 shows the exemplary mapping table after updating the corresponding license contract address.

TABLE 6

| NFT ID | Template ID | NFT creator | Modifiable | NFT creator Signature | Created By | License Contract Address |
|---|---|---|---|---|---|---|
| NFT1 | TEMPL001 | user01 | N | 2bcd . . . tyrr | User 1 | 0x . . . fgu1 |
| NFT2 | TEMPL002 | user01 | N | 3acd . . . pyrr | User 1 | 0x . . . fgu2 |
| NFT3 | TEMPL001 | user02 | N | 4ccd . . . kyrr | User 2 | 0x . . . fgu3 |
| NFT4 | TEMPL004 | user03 | N | 5dcd . . . 2yrr | User 3 | 0x . . . fgu4 |
| NFT5 | TEMPL005 | user04 | N | 6fcd . . . 5yrr | User 4 | 0x . . . fgu5 |
| NFT6 | TEMPL006 | user05 | N | 74cd . . . yyrr | User 5 | 0x . . . fgu6 |
| NFT7 | n . . . | n . . . | n . . . | n . . . | n . . . | 0x . . . fgu7 |

At step 330 of the method 300, the one or more hardware processors 104 of the system 100 are configured to deploy the smart contract generated for the NFT getting created at step 328 of the method 300, to execute for subsequent sales. The subsequent sales include a primary sale, and a secondary sale, and so on. In an embodiment, the primary sale includes directly purchasing from the creator. The secondary sale includes purchasing from new owners other than the creator.

FIG. 6 is a flowchart comprising steps for buying the NFT under a primary sale, in accordance with some embodiments of the present disclosure. As shown in FIG. 6, a potential buyer buys the NFT of the creator. The buyer accepts the license contract by signing it cryptographically. The system 100 assigns the license contract address to the buyer suggesting that the buyer must adhere to the clauses mentioned in this contract address.

Further, the license clauses are validated when a new owner lists the NFT for the sale. The listing is successful after validation of the NFT License. The system 100 may perform the validation of the license clauses against the one or more pre-defined conditions. For example, during the validation, the system 100 may check and verify that the listing price is not greater than a prescribed amount in contract, may verify that the NFT is not listed in certain geographies or marketplaces; may verify that the maximum revenue generated from copies of the NFT is not breached with the sale; may verify that the number of copies allowed to be sold in one listing is more than a prescribed number in the smart contract, and so on.

Figure 7:
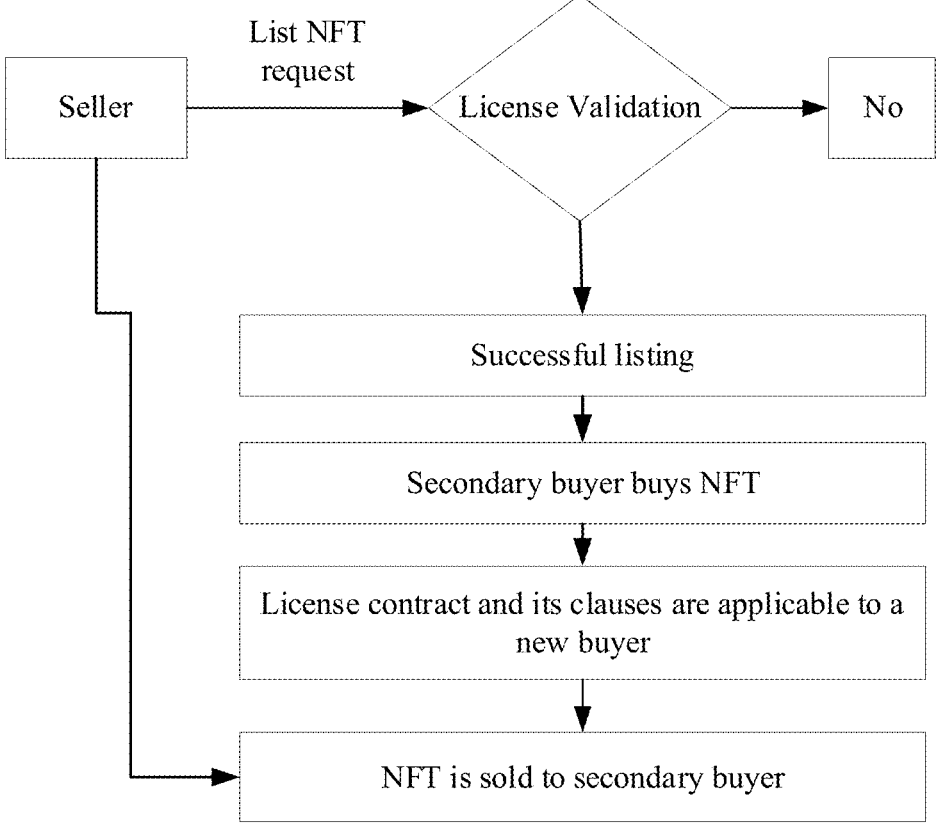
FIG. 7 is a flowchart comprising steps for buying the NFT under a secondary sale, in accordance with some embodiments of the present disclosure.

FIG. 7 is a flowchart comprising steps for buying the NFT under a secondary sale, in accordance with some embodiments of the present disclosure. As shown in FIG. 7, the secondary buyers in the secondary sale also need to accept the license clauses before the NFT gets transferred to them. The NFT license is validated on all subsequent listings. The secondary buyers are the buyers who buy from the primary buyers in the primary sale.

At step 332 of the method 300, the one or more hardware processors 104 of the system 100 are configured to request the administrator by the creator, to add one or more new tangible clauses and one or more new intangible clause, when the plurality of tangible clauses and a plurality of intangible clauses for each of the one or more NFT categories present in the plurality of clauses are not sufficient enough to create the custom NFT licensing template and the corresponding one or more custom clauses. In an embodiment, the new clause requesting module 214 is configured to request the administrator 202 to add the one or more new tangible clauses and one or more new intangible clause, when the plurality of tangible clauses and a plurality of intangible clauses for each of the one or more NFT categories present in the plurality of clauses are not sufficient to create the custom NFT licensing template.

An exemplary format of the SCBR function hook is provided below based on the clause details:

Clause Category: Royalty

Clause ID: TACL001

Dependent Clause ID: TACL002

Clause Description: Provision for the creator 210 to provide consent if they want to receive royalty or not.

Clause condition statement: Do you expect Royalty?

Clause condition statement ID: TACLEXP01 is fetched from database for Clause ID TACL001

SCBR Function Name: TACL001

SCBR Expression Parameter Name: expectedRoyalty

SCBR Expression Parameter Type: boolean

The above clause condition statement, the parameter names and the datatypes will be converted into semantics understood by Ethereum Smart contract as mentioned below in the form of the exemplary function hook:

```
methodType_SCBRFuncName_(SCBRExpressionType_SCBRExpressionNa
me)
    function TACL001 (boolean_expectedRoyalty)
        The creator 210 will now put values for clause –TACL001
    Account address of creator – creatorAccount is appended to SCBR
    expression to establish that these values belong to creator:
        function TACL001 (address creatorAccount,
        boolean_expectedRoyalty ) {
        }
```

Response Embedded into SCBR:

```
    For TACL001: the system 100 maintains a mapping structure of the
creator account and its royalty consent:
        Map: (address=>Boolean)
        Map name: royaltyConsent
function TACL001 (address creatorAccount, boolean _expectedRoyalty )
{
royaltyConsent[creatorAccount] = true;
}
```

The exemplary Extensible Markup Language (XML) code snippet specifying the metadata of the clause is shown below:

```
<?xml version="1.0" encoding="UTF-8" standalone="yes"?>
<clause ClauseID="TACL001">
  <clauseExpression>TACLEXP01</clauseExpression>
  <dependentClauseID>TACL002</dependentClauseID>
  <SCBR>
  <methodType="Function"    className="com.tcs.SCBRProcessor"
id="MS001" name="TACL001">
  <ParameterName>expectedRoyalty</ParameterName>
  <ParameterDataType>boolean</ParameterDataType>
  </methodType>
  </SCBR>
<Map></Map>
<category>creatorLicense</category>
</clause>
```

The methods and systems of the present disclosure provides the framework that contains the configurable and extendable NFT licensing options offers a unique way to customize intangible licensing terms between buyer and seller thereby allowing better terms and conditions to be mutually agreed during the sale process. The standard license terms are created by the administrator that contains both tangible and intangible terms and clauses. The tangible clauses are enforced by the smart contracts, whilst the intangible clauses can be customized when the creator is onboarded onto the marketplace which can be further extended during each NFT sale.

The methods and systems of the present disclosure safeguards the users with respect to IP rights and avoids the copyright infringement through the smart contract licensing templates and the NFTs can be available for primary and the secondary sales in the safe and secure platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of having a real-time configuration of asset licensing framework for generating non-fungible tokens. The present disclosure provides a standard framework which comprises a configurable set of licensing options that need to be agreed by the transacting parties at the time of NFT sale. These options are embedded into the NFTs in the form of smart contracts, which automatically get executed based on specific events such as secondary sale.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:
   creating, via one or more hardware processors, one or more non-fungible token (NFT) categories in a template registry, wherein the template registry comprises a clause template registry, an NFT licensing template registry, and a smart contract template registry;

fetching, via the one or more hardware processors, a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry;

assigning, via the one or more hardware processors, a predefined parameter value to each of the plurality of tangible clauses created for each of the one or more NFT categories, creating a place holder to each of the plurality of intangible clauses created for each of the one or more NFT categories, and storing in the clause template registry;

creating, via the one or more hardware processors, a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry;

generating, via the one or more hardware processors, a smart contract template dynamically, for each of the one or more NFT categories, based on a smart contract metadata, using the NFT licensing template associated with each of the one or more NFT categories, wherein the smart contract metadata is received from a smart contract metadata repository;

storing, via the one or more hardware processors, the smart contract template generated dynamically for each of the one or more NFT categories, in the smart contract template registry;

generating a unique linked list for a custom NFT licensing template, wherein the unique linked list for the custom NFT licensing template is in the form of a single-dimensional linked list that stores a user input as data and a clause pointer which refers to the next clause, wherein each clause contain the user input and an address field that contains a reference to the next clause and automatically reflect a change in selection in the unique linked list;

generating, via the one or more hardware processors, a smart contract, based on the unique linked list by the creator;

identifying, via the one or more hardware processors, a target blockchain platform and a crypto address for a deployment of the smart contract;

deploying, via the one or more hardware processors, the smart contract generated for a NFT getting created; and executing, via the one or more hardware processors, the smart contract generated for the NFT getting created, for subsequent sales, after signing by the creator.

2. The processor-implemented method of claim 1, wherein each clause of the plurality of clauses defined in the clause metadata repository, comprises clause details having a clause category, a unique clause identity (ID), a clause condition statement, and one or more response options provided for the clause condition statement, and are stored in the clause template registry.

3. The processor-implemented method of claim 1, wherein generating the smart contract template dynamically, for each of the one or more NFT categories, based on the smart contract metadata using the NFT licensing template associated with each of the one or more NFT categories, comprising:

fetching a smart contract business expression (SCBR) function name, for each of the one or more NFT categories, based on a unique clause ID associated with each of the plurality of tangible clauses;

defining a clause condition statement for each unique clause ID associated with each of the plurality of tangible clauses, for each of the one or more NFT categories, by an administrator;

extracting a function type, one or more parameters and one or more datatypes for each unique clause ID associated with each of the plurality of tangible clauses, for each of the one or more NFT categories;

creating a unique SCBR function hook for each unique clause ID associated with each of the plurality of tangible clauses, using the clause expression, the function type, the one or more parameters, and the datatypes, for each of the one or more NFT categories; and applying the unique SCBR function hook, on the NFT licensing template associated with each of the one or more NFT categories by the administrator, to generate the smart contract template, and signing the smart contract template by the administrator, for each of the one or more NFT categories.

4. The processor-implemented method of claim 1, further comprising:

selecting, via the one or more hardware processors, the NFT licensing template based on an NFT category chosen by a creator, by mapping with the unique template identity (ID), from the NFT licensing template registry;

choosing, via the one or more hardware processors, one or more tangible clauses out of the plurality of tangible clauses and one or more intangible clauses out of the plurality of intangible clauses, for the NFT licensing template, based on the one or more licensing rules, to create a custom NFT licensing template;

allowing, via the one or more hardware processors, the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template;

allowing, via the one or more hardware processors, the creator to provide a parameter value to (i) each of the one or more tangible clauses chosen, and (ii) the one or more custom clauses added, in the place holder associated to each clause;

storing, via the one or more hardware processors, (i) the parameter value provided to each of the one or more tangible clauses chosen, and the one or more custom clauses added, in the place holder associated to each clause, and (ii) each of the one or more intangible clauses chosen.

5. The processor-implemented method of claim 4, further comprising:

requesting, via the one or more hardware processors, the administrator by the creator, to add one or more new tangible clauses and one or more new intangible clause, when the plurality of tangible clauses and a plurality of intangible clauses for each of the one or more NFT categories are not sufficient.

6. A system, comprising:

a memory storing instructions;

one or more input/output (I/O) interfaces; and one or more hardware processors coupled to the memory via the one or more I/O interfaces, wherein the one or more hardware processors are configured by the instructions to:

create one or more non-fungible token (NFT) categories in a template registry, wherein the template registry comprises a clause template registry, an NFT licensing template registry, and a smart contract template registry;

fetch a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry;

assign a predefined parameter value to each of the plurality of tangible clauses created for each of the one or more NFT categories, creating a place holder to each of the plurality of intangible clauses created for each of the one or more NFT categories, and storing in the clause template registry;

create a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry;

generate a smart contract template dynamically, for each of the one or more NFT categories, based on a smart contract metadata, using the NFT licensing template associated with each of the one or more NFT categories, wherein the smart contract metadata is received from a smart contract metadata repository;

store the smart contract template generated dynamically for each of the one or more NFT categories, in the smart contract template registry;

generate a unique linked list for a custom NFT licensing template, wherein the unique linked list for the custom NFT licensing template is in the form of a single-dimensional linked list that stores a user input as data and a clause pointer which refers to the next clause, wherein each clause contain the user input and an address field that contains a reference to the next clause and automatically reflect a change in selection in the unique linked list;

generate, a smart contract based on the unique linked list by the creator;

identify, a target blockchain platform and a crypto address for a deployment of the smart contract;

deploy, the smart contract generated for a NFT getting created; and execute, the smart contract generated for the NFT getting created, for subsequent sales, after signing by the creator.

7. The system of claim 6, wherein each clause of the plurality of clauses defined in the clause metadata repository, comprises clause details having a clause category, a unique clause identity (ID), a clause condition statement, and one or more response options provided for the clause condition statement, and are stored in the clause template registry.

8. The system of claim 6, wherein the one or more hardware processors are configured to generate the smart contract template dynamically, for each of the one or more NFT categories, based on the smart contract metadata using the NFT licensing template associated with each of the one or more NFT categories, by:

fetching a smart contract business expression (SCBR) function name, for each of the one or more NFT categories, based on a unique clause ID associated with each of the plurality of tangible clauses;

defining a clause condition statement for each unique clause ID associated with each of the plurality of tangible clauses, for each of the one or more NFT categories, by an administrator;

extracting a function type, one or more parameters and one or more datatypes for each unique clause ID associated with each of the plurality of tangible clauses, for each of the one or more NFT categories;

creating a unique SCBR function hook for each unique clause ID associated with each of the plurality of tangible clauses, using the clause expression, the function type, the one or more parameters, and the datatypes, for each of the one or more NFT categories; and applying the unique SCBR function hook, on the NFT licensing template associated with each of the one or more NFT categories by the administrator, to generate the smart contract template, and signing the smart contract template by the administrator, for each of the one or more NFT categories.

9. The system of claim 6, wherein the one or more hardware processors are further configured to:

select the NFT licensing template based on an NFT category chosen by a creator, by mapping with the unique template identity (ID), from the NFT licensing template registry;

choose one or more tangible clauses out of the plurality of tangible clauses and one or more intangible clauses out of the plurality of intangible clauses, for the NFT licensing template, based on the one or more licensing rules, to create a custom NFT licensing template;

allow the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template;

allow the creator to provide a parameter value to (i) each of the one or more tangible clauses chosen, and (ii) the one or more custom clauses added, in the place holder associated to each clause;

store (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template.

10. The system of claim 9, wherein the one or more hardware processors are further configured to request the administrator by the creator, to add one or more new tangible clauses and one or more new intangible clause, when the plurality of tangible clauses and a plurality of intangible clauses for each of the one or more NFT categories are not sufficient.

11. One or more non-transitory machine-readable information storage mediums comprising one or more instructions which when executed by one or more hardware processors cause:

creating one or more non-fungible token (NFT) categories in a template registry, wherein the template registry comprises a clause template registry, an NFT licensing template registry, and a smart contract template registry;

fetching a plurality of tangible clauses and a plurality of intangible clauses for each of the one or more NFT categories, based on a plurality of clauses defined in a clause metadata repository, wherein each of the plurality of tangible clauses and each of the plurality of intangible clauses defines one or more licensing rules for each of the one or more NFT categories, and are stored in the clause template registry;

assigning a predefined parameter value to each of the plurality of tangible clauses created for each of the one or more NFT categories, creating a place holder to each of the plurality of intangible clauses created for each of the one or more NFT categories, and storing in the clause template registry;

creating a NFT licensing template for each of the one or more NFT categories, using the plurality of tangible clauses and the plurality of intangible clauses, wherein each NFT licensing template created for each of the one or more NFT categories comprises a unique template identity (ID) and audit data, and is stored in the NFT licensing template registry;

generating a smart contract template dynamically, for each of the one or more NFT categories, based on a smart contract metadata, using the NFT licensing template associated with each of the one or more NFT categories, wherein the smart contract metadata is received from a smart contract metadata repository;

storing the smart contract template generated dynamically for each of the one or more NFT categories, in the smart contract template registry;

generating a unique linked list for a custom NFT licensing template, wherein the unique linked list for the custom NFT licensing template is in the form of a single-dimensional linked list that stores a user input as data and a clause pointer which refers to the next clause, wherein each clause contain the user input and an address field that contains a reference to the next clause and automatically reflect a change in selection in the unique linked list;

generating a smart contract, based on the unique linked list by the creator;

identifying a target blockchain platform and a crypto address for a deployment of the smart contract;

deploying the smart contract generated for a NFT getting created; and executing the smart contract generated for the NFT getting created, for subsequent sales, after signing by the creator.

12. The one or more non-transitory machine-readable information storage mediums of claim 11, wherein each clause of the plurality of clauses defined in the clause metadata repository, comprises clause details having a clause category, a unique clause identity (ID), a clause condition statement, and one or more response options provided for the clause condition statement, and are stored in the clause template registry.

13. The one or more non-transitory machine-readable information storage mediums of claim 11, wherein generating the smart contract template dynamically, for each of the one or more NFT categories, based on the smart contract metadata using the NFT licensing template associated with each of the one or more NFT categories, comprising:

fetching a smart contract business expression (SCBR) function name, for each of the one or more NFT categories, based on a unique clause ID associated with each of the plurality of tangible clauses;

defining a clause condition statement for each unique clause ID associated with each of the plurality of tangible clauses, for each of the one or more NFT categories, by an administrator;

extracting a function type, one or more parameters and one or more datatypes for each unique clause ID associated with each of the plurality of tangible clauses, for each of the one or more NFT categories;

creating a unique SCBR function hook for each unique clause ID associated with each of the plurality of tangible clauses, using the clause expression, the function type, the one or more parameters, and the datatypes, for each of the one or more NFT categories; and applying the unique SCBR function hook, on the NFT licensing template associated with each of the one or more NFT categories by the administrator, to generate the smart contract template, and signing the smart contract template by the administrator, for each of the one or more NFT categories.

14. The one or more non-transitory machine-readable information storage mediums of claim 11, further comprising:

selecting the NFT licensing template based on an NFT category chosen by a creator, by mapping with the unique template identity (ID), from the NFT licensing template registry;

choosing one or more tangible clauses out of the plurality of tangible clauses and one or more intangible clauses out of the plurality of intangible clauses, for the NFT licensing template, based on the one or more licensing rules, to create a custom NFT licensing template;

allowing the creator to enhance the custom NFT licensing template, using the clause details in the clause template registry by adding (i) the one or more tangible clauses chosen out of the plurality of tangible clauses, (ii) the one or more intangible clauses chosen out of the plurality of intangible clauses stored in the clause template registry, to add one or more custom clauses to the custom NFT licensing template;

allowing the creator to provide a parameter value to (i) each of the one or more tangible clauses chosen, and (ii) the one or more custom clauses added, in the place holder associated to each clause;

storing (i) the parameter value provided to each of the one or more tangible clauses chosen, and the one or more custom clauses added, in the place holder associated to each clause, and (ii) each of the one or more intangible clauses chosen, to generate in a unique linked list for the custom NFT licensing template.

15. The one or more non-transitory machine-readable information storage mediums of claim 14, further comprising:

requesting the administrator by the creator, to add one or more new tangible clauses and one or more new intangible clause, when the plurality of tangible clauses and a plurality of intangible clauses for each of the one or more NFT categories are not sufficient.

* * * * *